July 4, 1939. M. E. HANSEN 2,165,099
MANUFACTURE OF PERFORATE RUBBER SHEETS
Filed May 5, 1937
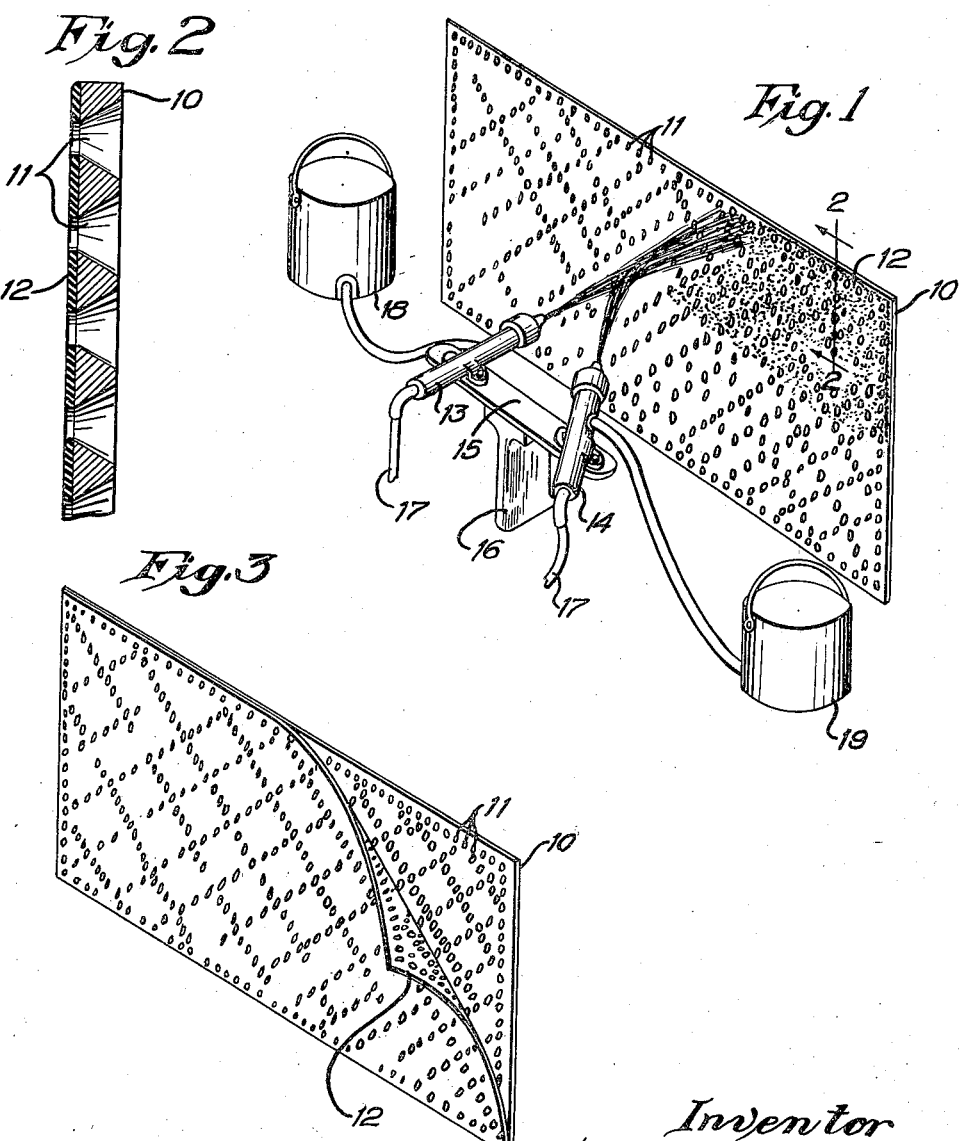
Inventor
Merrill E. Hansen
By Willis F. Avery
Att'y Patented July 4, 1939

2,165,099

UNITED STATES PATENT OFFICE 2,165,099

MANUFACTURE OF PERFORATE RUBBER SHEETS

Merrill E. Hansen, Akron, Ohio, assignor to American Anode Inc., Akron, Ohio, a corporation of Delaware Application May 5, 1937, Serial No. 140,857

7 Claims. (Cl. 18—58)

This invention relates to the manufacture of perforate rubber articles and is especially useful for manufacturing relatively thin rubber sheets provided with a multiple of apertures such as the perforate rubber sheets used in corsets, as battery separator sheets, and for other purposes.

The chief objects of the invention are to provide economical and efficient procedure for manufacturing perforate rubber sheets of uniformly high quality; to provide dependable procedure for making perforate rubber sheets with sharply defined clean-cut apertures free of burrs or edge irregularities, and of a variety of sizes and in any desirable relative disposition in the sheets; and to provide simple and inexpensive procedure adaptable to efficient commercial production of perforate rubber sheets. The manner in which these and other objects of the invention are attained will be apparent from the following description of the invention in a preferred embodiment illustrated in the accompanying drawing.

Of the drawing, Fig. 1 is a perspective view illustrating the principal step in the manufacture of a perforate rubber sheet according to the present invention and showing the application of rubber in finely-divided form to a perforate deposition base embodying certain novel features;

Fig. 2 is a vertical section, on an enlarged scale, taken on line 2—2 of Fig. 1;

Fig. 3 is a perspective view illustrating the step of stripping the perforate rubber sheet from the deposition base of Fig. 1.

For purposes of illustration, I will describe the manufacture of a rectangular rubber panel provided with a multitude of perforations of any desired size arranged in a simple design in the sheet, which might be used for example in the manufacture of a woman's corset. In the manufacture of such a perforate rubber panel, I provide a perforate deposition base such as the rectangular sheet-metal base 10 of suitable size and provided with a multitude of apertures 11 arranged in any desired design. The apertures may be as small as 3⁄32 inch in diameter and as large as desired, there being no limiting maximum size. For reasons later to be described, the apertures 11 preferably are made with flaring bores, as for example the conical bores illustrated more clearly in Fig. 2, so that the walls of the bores recede sharply from the deposition face of the base 10, recession angles of from thirty to forty-five degrees being most satisfactory for ordinary purposes. The deposition base should preferably be made of some material such as aluminum which will not be rusted or corroded by water or by mildly corrosive chemicals which, as will appear, are used in the present process.

The prepared deposition base 10 is then mounted, preferably in an upright position as in a substantially vertical plane or alternatively in a horizontal plane suitably supported at the edges to leave the apertures unobstructed, and a coating of rubber 12 constituting the perforate rubber sheet is applied thereto. The rubber is then dried, vulcanized, and stripped from the deposition base, or, if desired, either the vulcanization or both the drying and the vucanization may be performed after the perforate sheet is stripped from the base all according to conventional procedures. The perforate rubber may be vulcanized to the soft-vulcanized state and used for corset panels and the like, or it may be vulcanized to the hard-vulcanized state and used for battery separators, acid filters, etc.

The application of the rubber coating to the perforate deposition base preferably is effected by directing toward the deposition base a forceful stream of solid or semi-solid finely divided particles of rubber in a freshly coagulated or even only partially coagulated condition, so that particles striking the apertures in the sheet will pass through the apertures while particles striking the closed areas of the base will be deposited thereon in a non-flowing state to form a coherent sheet having unusually sharply-defined and clean-cut apertures. More specifically, the application of the rubber coating is effected by spraying toward the deposition base a forceful stream of droplets of a coagulable liquid rubber composition, preferably a compounded aqueous dispersion of rubber such as a natural rubber latex compounded with the usual vulcanizing ingredients, which should be in the freely-flowing and relatively non-viscous condition necessary for most satisfactory spraying, and then treating the sprayed droplets of coagulable rubber composition with a coagulant therefor before the droplets strike the deposition base. In this manner, the initially free-flowing and relatively non-viscous droplets of rubber composition are converted into solid or semi-solid particles which have been coagulated or at least partially coagulated and which will not flow but are highly cohesive and readily form a self-sustaining sheet upon the deposition base.

Such application of coagulated or partially coagulated rubber particles may be carried out most conveniently with a double spray gun comprising a latex spray gun 13 and a coagulant spray gun 14, both of conventional design, mounted upon a suitable supporting bar 15 provided with a convenient handle 16, and supplied with compressed air by tubes 17, 17, and supplied respectively with latex from a latex supply container 18, and with coagulant from a coagulant supply container 19.

Most satisfactory results are obtained when the latex spray is directed toward the deposition base substantially normally to the plane of the base and from a distance of about twelve inches, and when the coagulant spray is directed at an angle of less than 45° and preferably about 30° to the latex spray and caused to merge therewith at a point about four inches from the nozzle of the latex spray, i. e., at a point about one-third the distance from the latex gun nozzle to the deposition base. The combined spray producing solid or semi-solid rubber particles may be moved over the entire area of the deposition base one or more times to produce a perforate coating of any desired thickness.

Although satisfactory perforate rubber sheets may be made according to the process herein described using a deposition base with apertures having cylindrical bores, there is a tendency in such cases for some of the sprayed droplets or particles of rubber to be deposited upon the walls of the aperture bore, even when care is exercised to direct the spray normally of the deposition base, and as a result to form burrs or irregular edges about the apertures at the inner face of the rubber sheet adjacent the deposition base. Such burrs are not always undesirable and in some instances may even be advantageous for increasing the frictional characteristics of the sheet, but generally a smooth faced sheet having a clean-cut apertures is desired. By providing the apertures in the deposition base with receding bores, as illustrated in Fig. 2, I eliminate all deposition of rubber upon the walls of the bore with the resulting production of sharply defined clean-cut inner margins at the apertures, the outer margins generally being very slightly rounded transversely, but still sharply outlined.

A suitable liquid rubber composition for use in the present process contains 100 parts by weight of rubber added as the centrifugally concentrated (60% solids) latex of commerce, 1.25 parts of sulfur, 0.6 part of an organic accelerator, 2.0 parts zinc oxide, and 1.0 part of an age-resister, the various compounding ingredients being added as aqueous colloidal dispersions according to well-known practice. Such a composition will contain about 45% total solids and will have a viscosity only about one and a half times that of water, which of course means that the composition is relatively non-viscous and freely-flowing and entirely suitable for efficient spraying.

The coagulant composition may be a simple solution containing for example 10 parts by weight of an organic acid such as formic or acetic acid in 100 parts of a suitable solvent which may be water or an organic solvent such as alcohol or acetone, or the coagulant composition may be a solution of a polyvalent metal salt, for example a solution containing 10 parts by weight of calcium chloride, or calcium nitrate, or zinc acetate, dissolved in 100 parts of water, denatured alcohol, or acetone. Numerous other coagulants and solvents all well known, may be used in widely varying proportions. Generally, water solutions are preferred because no fire hazard is involved in their use, whereas considerable danger may be involved in spraying flammable hightly volatile solvents.

The present process permits spraying the latex in a relatively non-viscous freely-flowing state highly desirable for satisfactory spraying, but converts the sprayed droplets to a non-flowing but still coherent state before they are deposited upon the perforate base. As no substantial flow occurs after the sprayed droplets strike the perforate base and as no rubber is deposited within the bores of the base apertures, exceptionally sharp and clearly defined apertures are produced in the final product which accordingly is of high quality. The tendency, inherent in processes involving the spraying of uncoagulated liquid latex onto a perforate base, for the latex to web over and close the apertures is eliminated in the present process and the spraying rate accordingly need not be reduced to avoid such webbing over but may proceed at the full rate employed in coating imperforate bases. The simplicity and flexibility of the process commend it for dependable commercial production operations, and the extreme simplicity of the equipment required insures economy. The invention accordingly attains to a high degree the objects set forth.

The coagulable aqueous dispersion of rubber utilized in the present invention may be any naturally or artificially produced aqueous dispersion of caoutchouc, balata, gutta percha, or similar natural gum or of an artificially produced gum or other material of similar properties including the so-called synthetic rubbers such as polymerized chloroprene known as neoprene, polymerized isobutylene, and the like. All such dispersions may be concentrated, diluted, thickened, thinned, compounded, modified or otherwise preliminarily conditioned for use according to known procedures.

Any convenient type of perforate deposition base may be substituted for the perforate sheet metal base described, as for example, wire screens, perforate rubber sheets which desirably should be treated to prevent adhesion of the applied rubber coating, and even treated fabrics, may be used. The deposition base of course may be engraved or otherwise figured to produce a desired design in the perforate rubber sheet.

Numerous other modifications and variations of the invention as herein described may be made without departing from the spirit and scope of the invention as defined by the appended claims.

I claim:

1. The method of making a perforate rubber sheet which comprises providing a deposition base having perforations therein, spraying toward the deposition base droplets of a freely-flowing coagulable dispersion of rubber, treating the sprayed droplets in the course of their travel with a coagulant whereby the droplets are at least partially coagulated prior to contacting the deposition base and are deposited upon the said base in a non-flowing state to form thereon a coherent rubber deposit having apertures therein corresponding to the apertures in the deposition base, and stripping the perforate rubber from the deposition base.

2. The method of making a perforate rubber sheet which comprises providing a deposition base having perforations therein, directing upon the deposition base a combined spray of a freely flowing coagulable dispersion of rubber and of a coagulant therefor, whereby a rubber coating is deposited upon the close areas of the deposition base in a substantially non-flowing state, and stripping the rubber from the deposition base.

3. The method of making a perforate rubber sheet which comprises providing a sheet deposition base having a multitude of perforations therein, mounting the deposition base with the perforations unobstructed for free passage therethrough of sprayed material, directing upon the deposition base in a substantially normal direction a sprayed stream of droplets of a freely-flowing coagulable dispersion of rubber, merging with the said stream before it contacts the deposition base a sprayed stream of a coagulant for said dispersion, whereby a non-flowing coating of rubber is deposited upon the deposition base, and stripping the rubber from the base.

4. The method of making a perforate rubber sheet which comprises providing a sheet deposition base having a multitude of perforations therein, mounting the deposition base in such manner as to leave the apertures unobstructed for free passage therethrough of sprayed material, directing upon the deposition base in a substantially normal direction a sprayed stream of droplets of a freely-flowing coagulable dispersion of rubber, merging with the said stream at an angle of less than 45 degrees a sprayed stream of a coagulant for said dispersion, whereby a non-flowing coating of rubber is deposited upon the deposition base, and stripping the rubber from the base.

5. The method of making a perforate rubber sheet which comprises providing a sheet deposition base having a multitude of perforations therein with the bores of the perforations receding sharply from the deposition face of the sheet base, spraying rubber latex upon the deposition base to build thereon a coating of rubber having apertures therein corresponding to the apertures in the deposition base, and stripping the perforate rubber from the deposition base.

6. The method of making a rubber sheet having sharply defined apertures therein which comprises providing a sheet deposition base having a multitude of perforations therein with the bores of the perforations receding sharply from the deposition face of the sheet base, directing upon the deposition base a combined spray of a freely flowing coagulable dispersion of rubber and of a coagulant therefor, whereby a rubber coating is deposited upon the closed areas of the deposition base in a substantially non-flowing state, but not within the bores of the apertures, and stripping the perforate rubber from the deposition base.

7. The method of making a perforate rubber sheet which comprises providing a deposition base having a substantially planar face pervaded by perforations corresponding to the perforations desired in the finished sheet, supporting the deposition base in a position suitable for spraying coating material onto the planar face, spraying only toward said planar face of the deposition base droplets of a free-flowing coagulable dispersion of rubber, treating the sprayed droplets in the course of their travel toward the deposition base with a coagulant whereby the droplets are at least partially coagulated prior to reaching the deposition base and are deposited upon the perforate planar face only of said base in a non-flowing state to form thereon a coherent, substantially planar rubber deposit having apertures therein corresponding to the apertures in the deposition base, and stripping the perforate rubber sheet from the deposition base.

MERRILL E. HANSEN.

CERTIFICATE OF CORRECTION.

Patent No. 2,165,099.   July 4, 1939.

MERRILL E. HANSEN.

It is hereby certified that error appears in the printed specification of the above numbered patent requiring correction as follows: Page 1, first column, line 4, for the word "multiple" read multitude; and second column, line 9-10, for "rubbetr" read rubber; page 2, second column, line 2, for "hightly" read highly; page 3, first column, line 1, claim 2, for "close" read closed; and that the said Letters Patent should be read with this correction therein that the same may conform to the record of the case in the Patent Office.

Signed and sealed this 29th day of August, A. D. 1939.

(Seal)

Leslie Frazer,
Acting Commissioner of Patents.